US008340132B2

(12) United States Patent
Liva (10) Patent No.: US 8,340,132 B2
(45) Date of Patent: Dec. 25, 2012

(54) METHOD FOR CONTENTION RESOLUTION IN TIME-HOPPING OR FREQUENCY-HOPPING

(75) Inventor: Gianluigi Liva, Munich (DE)

(73) Assignee: Deutsches Zentrum fuer Luft— und Raumfahrt e.V. (DE)

( * ) Notice: Subject to any disclaimer, the term of this patent is extended or adjusted under 35 U.S.C. 154(b) by 234 days.

(21) Appl. No.: 12/903,246

(22) Filed: Oct. 13, 2010

(65) Prior Publication Data

US 2011/0096795 A1    Apr. 28, 2011

(30) Foreign Application Priority Data

Oct. 23, 2009   (DE) .................. 10 2009 050 475

(51) Int. Cl.
*H04J 3/24* (2006.01)
(52) U.S. Cl. .................. 370/474; 370/337; 370/442
(58) Field of Classification Search .................. 370/474, 370/330, 436, 478, 337, 347, 349, 442; 714/746, 714/752
See application file for complete search history.

(56) References Cited

U.S. PATENT DOCUMENTS

| | | | | |
|---|---|---|---|---|
| 5,751,704 | A * | 5/1998 | Kostic et al. ................. | 370/335 |
| 5,896,375 | A * | 4/1999 | Dent et al. .................... | 370/347 |
| 8,094,672 | B2 * | 1/2012 | Casini et al. ................. | 370/447 |
| 2003/0174663 | A1 * | 9/2003 | Dillon ......................... | 370/316 |
| 2006/0171418 | A1 | 8/2006 | Casini et al. | |
| 2006/0253763 | A1 * | 11/2006 | Oliva et al. .................. | 714/746 |

FOREIGN PATENT DOCUMENTS

| | | |
|---|---|---|
| EP | 1686746 A1 | 8/2006 |
| EP | 2187692 A1 | 5/2010 |

OTHER PUBLICATIONS

Xiaohua Li, Smart Contention Resolution in random access wireless networks with unknown multiple users: a joint layer design approach,2003, State University of New York at Binghamton, pp. 1-5.*

Enrico Casini et al, "Contention Resolution Diversity Slotted ALOHA (CRDSA): An Enhanced Random Access Scheme for Satellite Access Packet Networks", IEEE Transactions on Wireless Communications, vol. 6, No. 4, Apr. 2007, pp. 1408-1419, ISSN: 1536-1276.

Alex W. Lam et al., "Time-Hopping and Frequency-Hopping Multiple-Access Packet Communications", IEEE Transactions on Wireless Communications, vol. 38, No. 6, Jun. 1990, pp. 875-888.

* cited by examiner

*Primary Examiner* — Hassan Kizou
*Assistant Examiner* — Romani Ohri
(74) *Attorney, Agent, or Firm* — Clements Bernard PLLC; Gregory N. Clements (57) ABSTRACT

A method of transmitting data, whereby the data is transmitted by using a multiple access frame divided in logical slots. Each data packet is divided into k units which are decoded by an (n,k) decoder, producing n-k redundant units. The n units are transmitted within a multiple access frame in n different slots according to a time-hopping pattern, a frequency-hopping pattern or a combination of both.

At the receiver side lost or corrupted data packets are recovered by using the redundant units, whereby the presence of a unit for each slot is detected. If a unit is present in a slot and has been transmitted without collisions, this unit is recovered. If a sufficient k+δ amount of units composing a data packet is recovered, the packet level decoder is used to recover the remaining n-k-δ units which experienced collisions in the respective slots.

6 Claims, 10 Drawing Sheets

METHOD FOR CONTENTION RESOLUTION IN TIME-HOPPING OR FREQUENCY-HOPPING

FIELD OF THE INVENTION

The invention is related to a method of transmitting data to an access point over a transmission channel which is shared among a plurality of users.

DESCRIPTION OF THE RELATED ART

Figure 1:
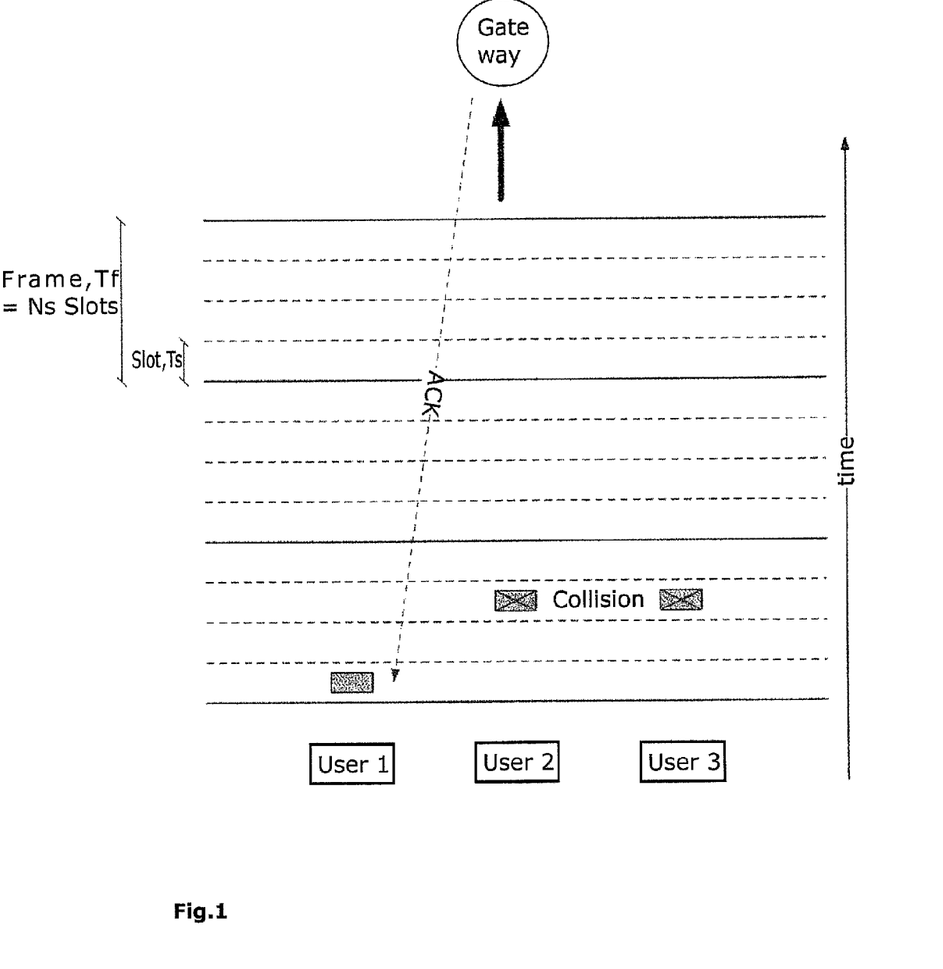
FIGS. 1 and 2 the process of the Slotted ALOHA method according to the state of the art, FIG. 3 the throughput T in the Slotted ALOHA method, FIGS. 4 and 5 the process of the CRDSA method according to the state of the art, FIG. 6 the throughput T of the CRDSA method compared to the throughput T of the Slotted ALOHA method, FIG. 7 the process of an example of the inventive method, FIG. 8 a comparison of the throughput for Slotted ALOHA, THMA and the inventive method, FIG. 9 a comparison of the thresholds G*, which corresponds to the maximum throughput achievable for the different schemes, for different (n,k) codes versus the average power penalty, and FIG. 10 an example on how a MAC frame can be divided into time and frequency slots.
Figure 2:
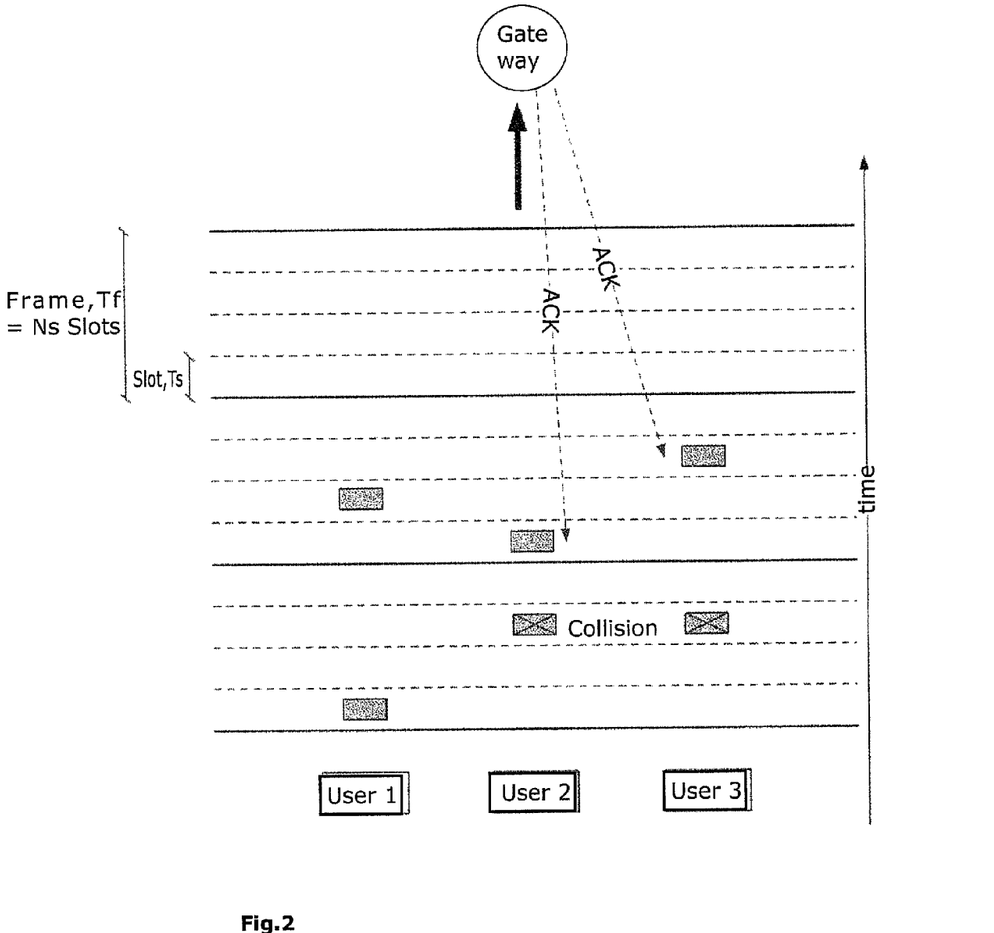

A known method for such a transmission of data is the Contention Resolution Diversity Slotted ALOHA (CRDSA) method. This method could for instance be used in the case of digital packetized uplink from many grounds stations towards a satellite. If we assume that there is no coordination between the users, i.e., the users may transmit their data packets on the same carrier frequency and in the same time instant and if we further assume that there is no Code Division Multiple Access (CDMA) it is obvious that packets sent by various users may collide on the communication medium, meaning that they will create interference among each other. The Slotted ALOHA method is a known protocol aiming to manage such uncoordinated multiple access schemes. In the Slotted ALOHA method the time access is partitioned in frames of duration Tf. Each frame is further partitioned in Ns slots of duration Ts=Tf/Ns. Each user must align his packet transmission to a slot, i.e., a synchronization with the frame structure must be kept by each user. Each user then transmits data independently with respect to the others and awaits for an acknowledgement from the gateway, which is the common access point. If no acknowledgement is received meaning that a collision has taken place on the communication medium, the user retransmits his packet with a random delay. This procedure is repeated until the packet transmission is successful. The concept of the Slotted ALOHA method is shown in FIGS. 1 and 2.

Figure 3:
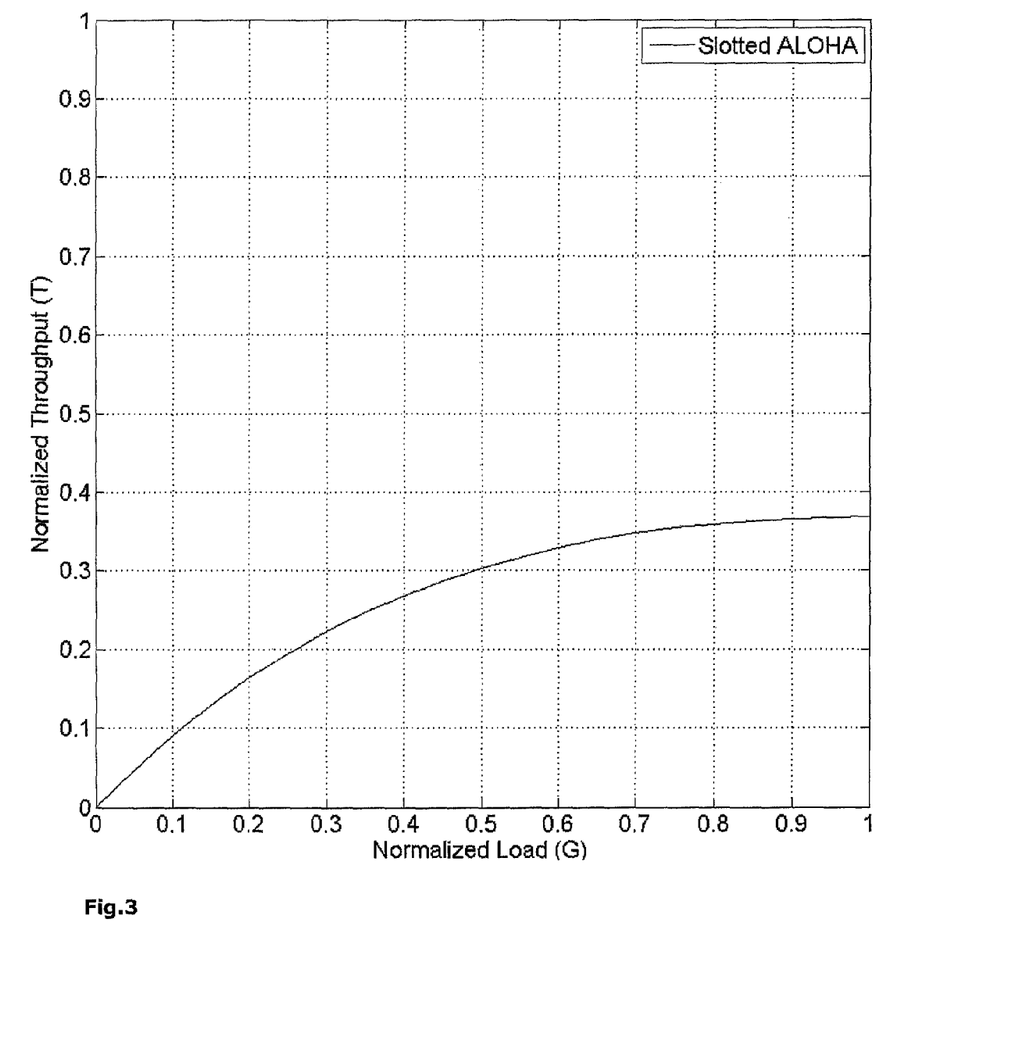

The throughput achieved by the Slotted ALOHA method is defined as $T(G)=Ge^{-G}$, where by T we denote the normalized throughput as the average number of packets which achieve a successful transmission within a slot, and G is the normalized offered traffic, i.e., the average number of packets sent per slot. The peak throughput for the Slotted ALOHA method is achieved at G=1, for which $T \cong 0.3679$. This means that if G=1 the fraction of packets which will be transmitted successfully in a transmission attempt will be about 36%. G is defined as G=m/n, whereby m is the number of packet transmission attempts per frame and n is the number of slots per frame. The throughput which can be achieved with the Slotted ALOHA method as a function of the offered traffic G is shown in FIG. 3.

As an improvement of the Slotted ALOHA method the Contention Resolution Diversity Slotted ALOHA (CRDSA) method has been developed. Hereby each user transmits two copies of the same packet within a frame in two randomly selected slots. In the header of each packet a pointer to the position of the twin packet is written. If one packet is received without collision by the gateway or access point the pointer can be extracted from the header and is used by the gateway to identify where the twin packet is located in the frame structure. In case the twin packet collided with another packet, an interference cancellation process takes place with the following steps:

The waveform representation of the twin packet is reconstructed at the gateway, by decoding the correctly received packet, re-encoding it, and modulating it.

The so-obtained waveform is subtracted from the received signal within the time slot of the twin copy. This is equivalent to canceling the interference caused by the twin packet to the packet colliding in the same slot.

The collided packet in this slot can now be decoded.

This process can be iterated, meaning that the recovery of the collided packet will provide a pointer to the twin packet of the collided one. Thus by using this cascade effect, many packets can be recovered by this interference cancellation procedure.

Figure 4:
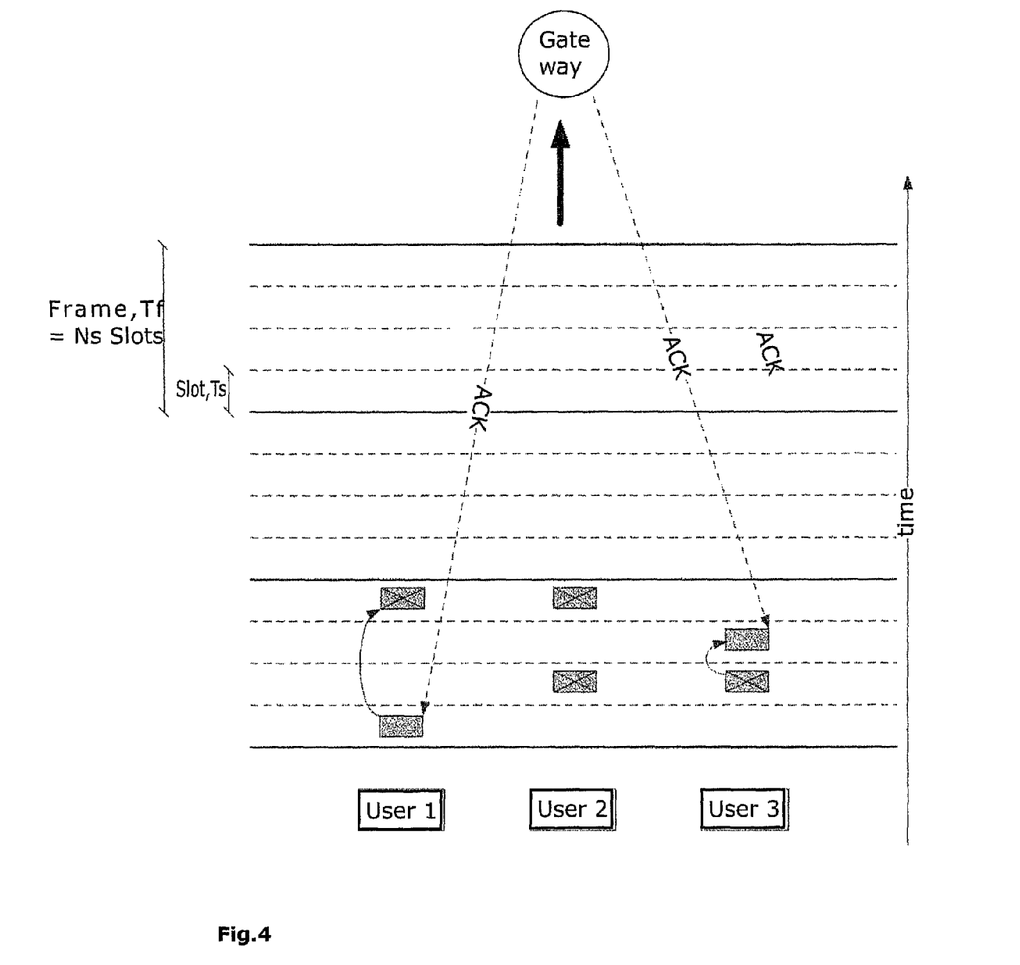
Figure 5:
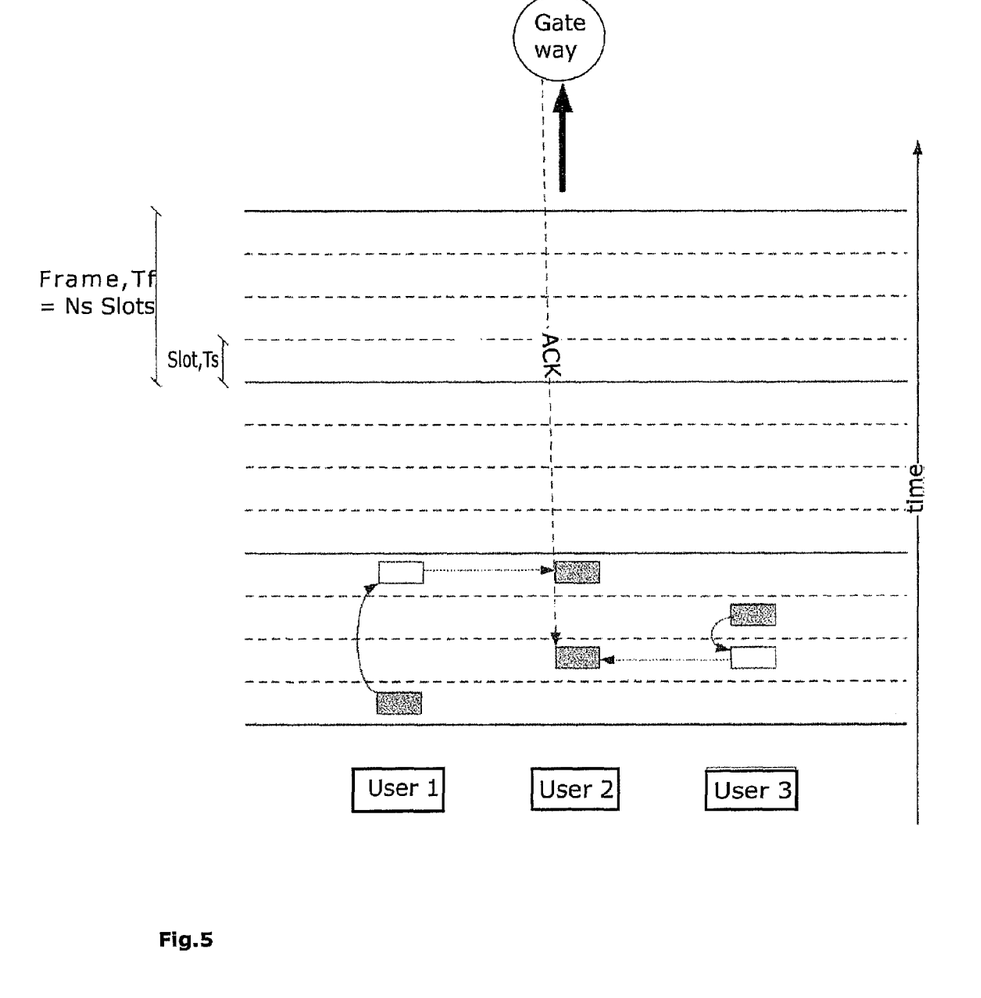

This procedure is depicted in FIGS. 4 and 5 whereby FIG. 4 shows that user 1 sends two copies of a packet. One copy leads to a collision while the other one is correctly received by the gateway which sends the acknowledgement. The same happens for the packets sent by user 3. Both packets which have been sent by user 2 are lost due to collisions. As it is shown in FIG. 5 the interference caused by the packet sent by user 1 on the packet of user 2 in the forth time slot is cancelled. This permits to recover the packet of user 2. As an alternative the interference caused by user 3 to user 2 may be cancelled by a subtraction as described above.

Note that average CRDSA uses more transmission power than Slotted ALOHA for a given value of G. In fact, with CRDSA a packet is replicated two times, leading to a doubling of average power. We hence introduce a figure to measure the excess in power w.r.t. Slotted ALOHA as $$DP=10*\log 10(P\_CRDSA/P\_SA)dB,$$

where P_CRDSA is the average transmission power of CRDSA and P_SA in the one of Slotted ALOHA. In the case of CRDSA with repetition rate=2, DP=3 dB. If higher repetition rates are used (e.g., each packet is replicated X times), DP increases as DP=10*log 10(X).

Thus DP gives us a figure on how much power is consumed by CRDSA in excess w.r.t. Slotted ALOHA.

Figure 6:
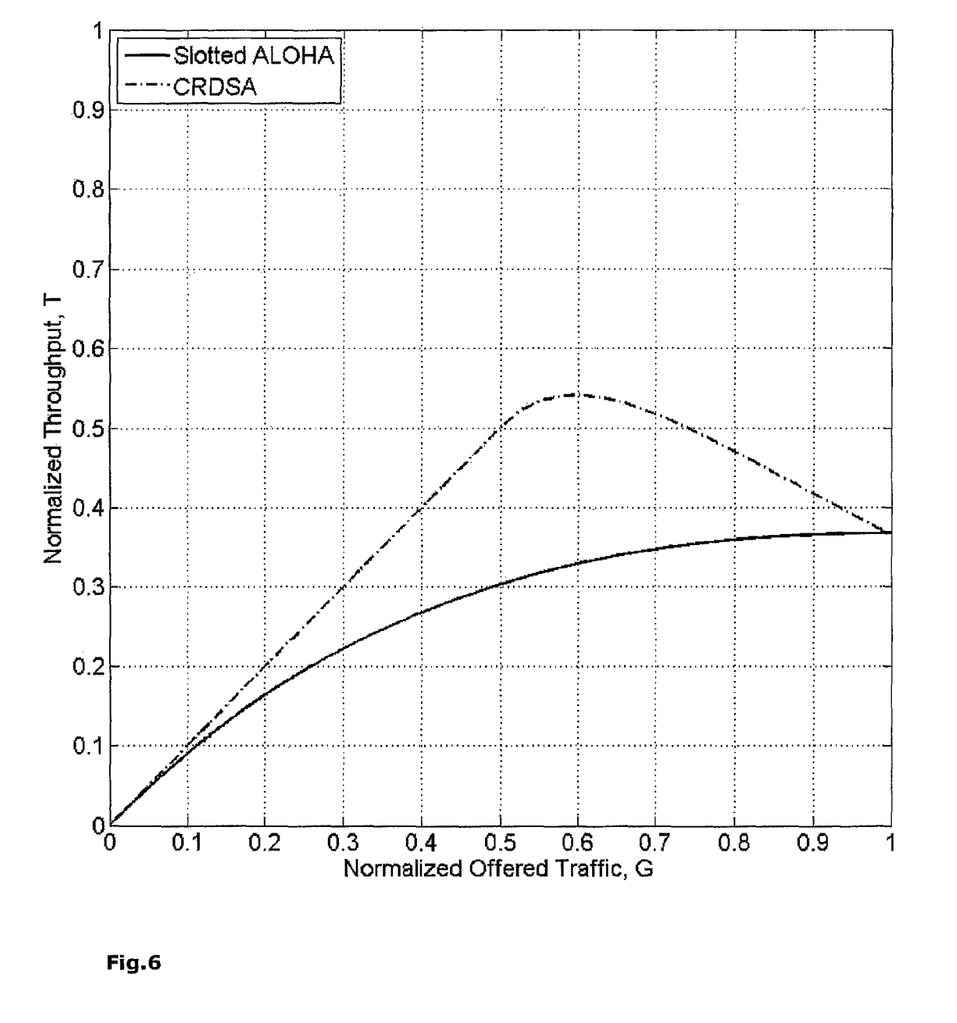

Simulation results provided in "E. Casini, R. D. Gaudenzi, and O. D. R. Herrero, —Contention resolution diversity slotted aloha (crdsa): An enhanced random access scheme for satellite access packet networks. —IEEE Transactions on Wireless Communications, vol. 6, pp. 1408-1419, April 2007" show that almost in the whole range G∈[0.1] the CRDSA method provides a larger throughput, with a peak of $T \cong 0.55$ for $G \cong 0.65$. This is shown in FIG. 6. As can be further seen the limit for which the normalized throughput is almost linear is extended from G=0.1 for Slotted ALOHA to G=0.4 for CRDSA, meaning that for loads lower than G=0.4 almost all the transmission attempts are successful.

Another type of improvement, called time-hopping multiple access (THMA) was also proposed in A. W. Lam and D. V. Sarwate *"Time-Hopping and Frequency-Hopping Multiple-Access Packet Communications"*, IEEE Transactions on Communications, vol. 38, no. 6, pp. 875-888, June 1990. When THMA is used, each burst is divided in k sub-packets (called in the following "units"). The k units are thus encoded by a (n,k) packet-level linear block code, resulting in n>k units. The multiple access (MAC) frame is consequently organized in NCSA=k*NSA slots, each of duration T_{CSA}=T{SA}/k. The n units related to each burst are then sent in n different slots (within a MAC frame) according to a time-hopping pattern. The time-hopping pattern can be selected randomly, according to a pseudo-random number generator. The pattern can be signaled by embedding in each unit a small header containing the generator seed. The receiver side, units which collided are declared as lost. Considering a specific user, if e units have been lost and e<=n−k, the packet-level decoder recover them. This approach, which is discussed in A. W. Lam and D. V. Sarwate *"Time-Hopping* and Frequency-Hopping Multiple-Access Packet Communications", IEEE Transactions on Communications, vol. 38, no. 6, pp. 875-888, June 1990, allows achieving a throughout higher with respect to that of SA when the offered traffic is moderate-low.

SUMMARY OF THE INVENTION

It is an object of the present invention to improve the throughput and/or the average power penalty DP in a method for transmitting data, whereby a transmission channel towards an access point is shared among a plurality of users. This object is achieved by the features of method claim 1.

In a method of transmitting data a common transmission channel towards an access point is shared among a plurality of users. The data is transmitted using a multiple access frame divided in logical slots. These can be time slots or frequency slots or a combination of both. The inventive method comprises the following steps: each data packet is divided into k units. A data packet can be referred to also as a "burst". The k units are encoded by an (n,k) decoder, whereby n−k redundant units are produced. The n units are transmitted within a multiple access frame in n different slots according to a time-hopping pattern, a frequency-hopping pattern or a combination of both. Thereby, the positions of the n units composing a data packet are written in a header appended to each unit.

Lost or corrupted data packets at the receiver side are recovered by using the redundant units. Thereby, the following method steps are performed: For each slot the presence of a unit is detected. If a unit is present in a slot and has been transmitted without collisions, this unit is recovered. This recovered unit together with its header is stored in a memory together with an index of the slot where they have been recovered. If a sufficient amount of k+δ units composing a data packet is recovered, the packet level decoder is used to recover the remaining n−k−δ units which experienced collisions in the respective slots. Hereby δ is a small number usually called "overhead", that ideally should be equal to 0.

According to the inventive method, the interference caused by the n−k−δ units from the slots where they were transmitted is removed using the information about the position of the units contained in the header of the recovered k+δ units. After that, units of other data packets which have experienced a collision with the n−k−δ units can be recovered.

By the inventive method it is possible to
a) Improve the throughput for a given average power penalty DP, compared to the methods known from the state of the art;
b) Reduce the average power penalty DP, achieving at the same time a throughput comparable to that of the methods known from the state of the art.

It is preferred that the interference cancellation steps are performed iteratively so that, when a slot is cleaned, units of other data packets can be recovered. Thereby, these units are used to recover other units belonging to the same data packet, whose interference can be removed from the respective slot. Thereby further slots can be cleaned so that the interference cancellation steps can be continued.

The units and the headers can be protected before transmission by a physical layer error correction code.

Encoding of the k units can be performed using a binary linear block code, in particular a Hamming Code, a BCH Code, a Reed Muller Code or by using a Reed Solomon Code.

It is preferred to use a (4,2) code or a (6,4) code for encoding the k units. The multiple access frame can be divided into 100 or 400 slots for example.

BRIEF DESCRIPTION OF THE DRAWINGS

Preferred embodiments of the invention will be described in connection with the following Figures. The Figures show:

FIG. 1 to 6 have been described in connection with the known state of the art.

DETAILED DESCRIPTION OF THE INVENTION

Figure 7:
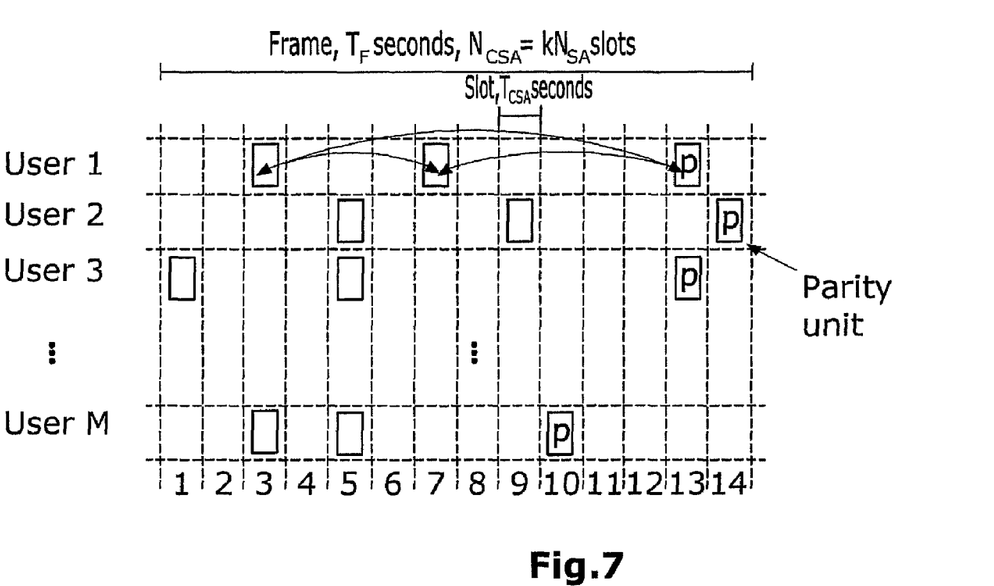

According to FIG. 7 on the transmitter side the inventive method works as follows: Each packet is divided into k units. If we assume that a packet is made by L bits each unit would then consist of u=L/k bits (assuming that L is dividable by k).

The k units are input to an (n,k) encoder, producing n−k redundant units. The encoding can be performed, for instance, using a binary linear block code. In such case, if we name $d_0, d_1, \ldots, d_{k-1}$, the k data units, the n−k redundant units $p_0, p_1, \ldots, p_{n-k-1}$ are obtained as linear combinations of the k data units, e.g. $p_i = g_{i,0} d_0 + g_{i,1} d_1 + g_{i,2} d_2 + g_{i,3} d_3 + \ldots + g_{i,k-1} d_{k-1}$, being the coefficient g_i,j an element of a Galois field $GF(2^p)$, and being the operations performed symbol-wise (where a symbol is made by bits) all along the (u/p) symbols composing the units. In the specific case of p=1, a binary linear block code is used, and g_i,j is either equal to 0 or 1, and the operations are performed bit-wise.

The n units are then transmitted within a MAC frame, selecting the slots according to uniform distribution. The positions of the n units composing a burst are signalled in an ad-hoc header that is appended to each unit. The units and the header are protected, before transmission, with a physical layer error correcting code.

On the receiver side, for each slot a detection is performed to reveal the presence of a unit. If a unit is detected, a decoding attempt is performed. If in the slot only one unit is present (i.e., there are no collisions), the physical layer decoding may proceed successfully. Once the unit and its header have been recovered, they are stored in memory together with the index of the slot where it was recovered. If a sufficient amount k+δ of units composing a burst is recovered (using an MDS code as a Reed-Solomon one, this amount corresponds to k), the packet level decoder can be used to reconstruct the remaining n−k−δ units (which experienced collisions in the respective slots).

At this stage, it is possible to remove the interference caused by the n−k−δ units from the slots where they were transmitted (this information is contained in the header that is attached to each unit, and that has been thus recovered together with the received k−δ units). The interference cancellation can thus permit to recover further units of other bursts, and the procedure can proceed iteratively (IC allows cleaning slots, and allowing the recovery of other units, which may permit to reconstruct other units, whose IC can be removed, and so on).

Figure 8:
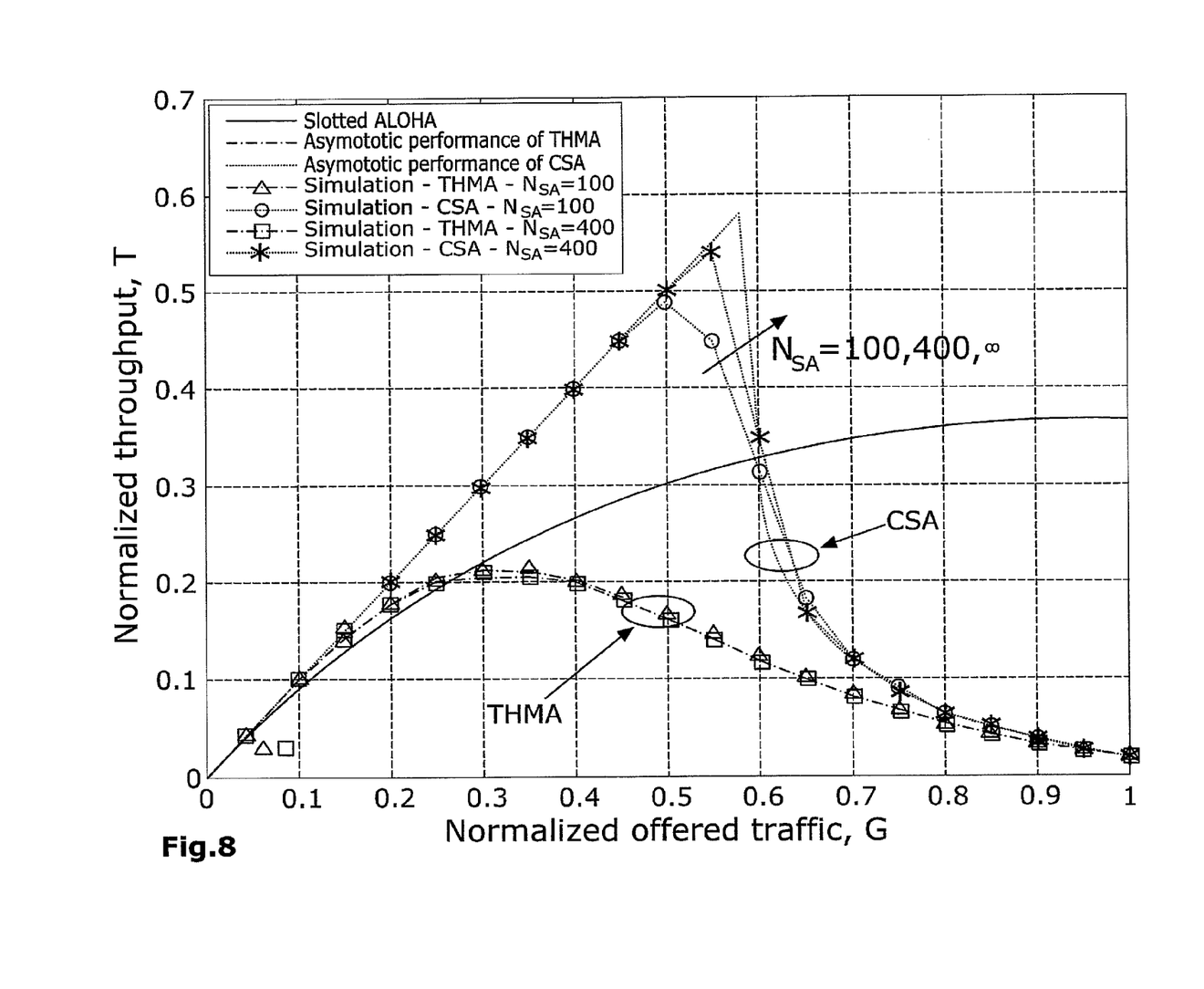

In FIG. 8 the throughput for different slotted ALOHA schemes is presented as a result of a simulation campaign. The scenario considers frames divided in Ns=100 slots and 400 slots. In the chart the curves refer to slotted ALOHA, the method proposed in this invention, whereby n=7 and k=4 and THMA with n=7 and k=4. Note that for the proposed invention the average power penalty DP can be calculated as DP=10*log 10(n/k) dB. According to FIG. 9 a throughput close to 0.55 is achieved with a power penalty DP=2.4 dB, while CRDSA achieves this throughput with DP=3 dB. Hence, the proposed invention saves (in this specific case) 0.6 dB of power.

The three proposed probability distributions provide throughput peaks close to 0.55, and the relation between throughput and traffic is almost linear up to traffics close to 0.5, meaning that, even when the system is 50% loaded, the probability of transmission success is for each user almost equal to 1.

Figure 9:
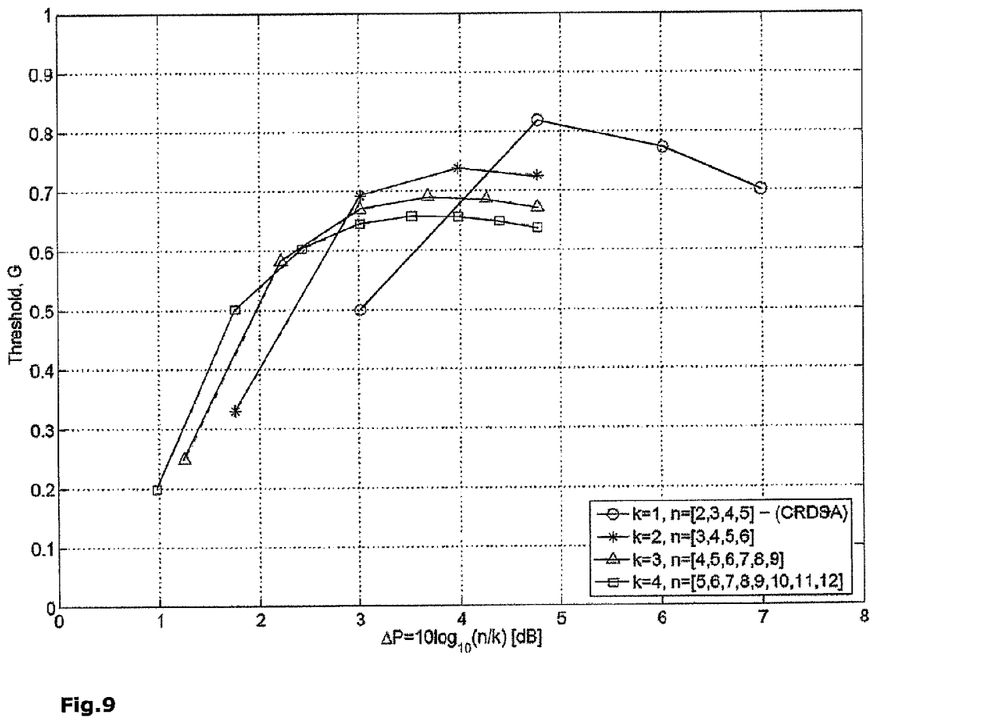

FIG. 9 shows the values of offered traffic up to which the packet loss probability is negligible (G^*), for CRDSA and for the proposed CSA. The thresholds are provided as a function of the average power increment w.r.t. SA (referred as average power penalty), which is given by DP=10*log_{10}(n/k). Considering codes with rate n/k=2, thus leading to a penalty of 3 dB, we note that the best threshold is obtained by CSA based on a (4,2) code, for which G^*=0.692. A repetition-2 CRDSA would provide a much lower threshold G^*=0.5. Note also that the same threshold G^*=0.5 can be obtained by using CSA with a (6,4) code, thus saving more than 1.2 dB of average power.

Figure 10:
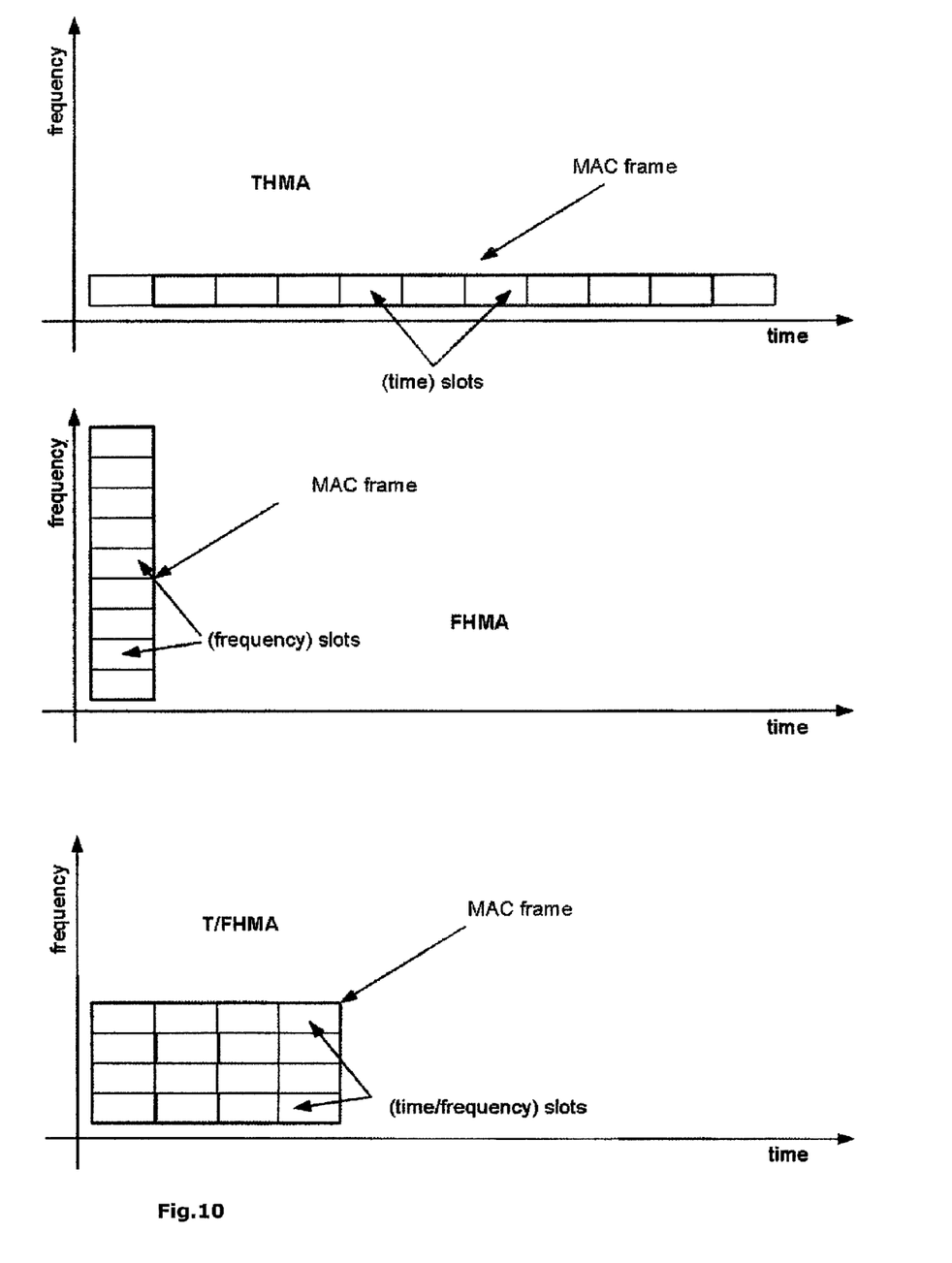

A schematic example showing how a MAC frame can be divided into different slots in the time and/or the frequency domain is shown in FIG. 10. The method according to the invention can be applied both in a THMA or FHMA scheme or in a T/FHMA scheme. The inventive method can be applied in all types of commercial wireless and wired transmission systems. The idea underlying this invention is especially interesting for interactive satellite services as DVB-RCS.

The invention claimed is:

1. Method of transmitting data, whereby a transmission channel towards an access point is shared among a plurality of users,
the data being transmitted using a multiple-access frame divided in logical slots, the method comprising the steps:
dividing each data packet into k units,
encoding the k units by a (n,k) linear block encoder, producing n−k redundant units,
transmitting the n units within a multiple-access frame in n different slots according to a time-hopping pattern, a frequency hopping pattern or a combination of both,
whereby the positions of the n units composing a data packet are written in a header appended to each unit,
recovering lost or corrupted data packets at the receiver side by using the redundant units by performing the steps:
detecting the presence of a unit for each slot,
if a unit is present in a slot and has been transmitted without collisions, recovering this unit,
storing a recovered unit and its header in a memory together with an index of the slot where they have been recovered,
if a sufficient amount k+δ of units composing a data packet is recovered, the packet level decoder is used to recover the remaining n−k−δ units which experienced collisions in the respective slots,
the method further comprising the steps of:
removing the interference caused by the n−k−δ units from the slots where they were transmitted using the information about the position of the units contained in the header of the recovered k+δ units and
recovering units of other data packets which have experienced a collision with the n−k−δ units.

2. The method according to claim 1, whereby the interference cancellation steps are performed iteratively, so that when a slot is cleaned, units of other data packets can be recovered, whereby these units are used to recover other units belonging to the same data packet, whose interference can be removed from the respective slot, thereby cleaning further slots.

3. The method according to claim 1, whereby the units and the header are protected before transmission by a physical layer error correction code.

4. The method according to claim 1, whereby the encoding of the k units is performed using a binary linear block code, in particular a Hamming Code, a BCH Code, a Reed Muller Code or by using a non-binary Reed Solomon Code.

5. The method according to claim 1, whereby encoding is performed by using a (4,2) code or a (6,4) code.

6. The method according to claim 1, whereby a multiple access frame is divided into 100 or 400 slots.

* * * * *